United States Patent [19]

Meyer et al.

[11] Patent Number: 6,002,716
[45] Date of Patent: Dec. 14, 1999

[54] EQUALIZER WITH EXTENDED CHANNEL ESTIMATION FOR A RECEIVER IN A DIGITAL TRANSMISSION SYSTEM

[75] Inventors: Raimund Meyer, Nürnberg; Robert Fischer, Erlangen; Wolfgang Gerstacker, Nürnberg; Johannes Huber, Langensendelbach; Peter Schramm, Hummeltal, all of Germany

[73] Assignee: U.S. Philips Corporation, New York, N.Y.

[21] Appl. No.: 08/952,832

[22] PCT Filed: Apr. 7, 1997

[86] PCT No.: PCT/IB97/00360

§ 371 Date: Nov. 25, 1997

§ 102(e) Date: Nov. 25, 1997

[87] PCT Pub. No.: WO97/39536

PCT Pub. Date: Oct. 23, 1997

[30] Foreign Application Priority Data

Apr. 12, 1996 [DE] Germany .......................... 196 14 543

[51] Int. Cl.⁶ .................................................. H03H 07/30
[52] U.S. Cl. .................... 375/231; 370/292; 369/724.16; 369/724.2
[58] Field of Search .................................... 375/229, 231, 375/232, 233, 210, 340, 341, 343, 316; 370/290, 291, 292; 364/724.01, 724.16, 724.19, 724.2

[56] References Cited

U.S. PATENT DOCUMENTS

| | | |
|---|---|---|
| 4,791,665 | 12/1988 | Bogart et al. ............................ 379/207 |
| 4,811,360 | 3/1989 | Potter ........................................ 375/11 |
| 5,199,047 | 3/1993 | Koch ........................................ 375/13 |

(List continued on next page.)

OTHER PUBLICATIONS

"A Viterbi Algorithm with Soft–Decision Outputs and its Applications" by Joachim Hagenauer and Peter Hoeher, Proceedings of the Globecom 1989, pp. 47.1.1–47.1.7, Dallas, 1989.

"An Alternative Approach to Minimum Mean–Squared Error DFE with Finite Length Contstraint", W. Gerstacker, International Journal of Electronics and Communications (AEU), vol. 50 (No. 1), 1996.

(List continued on next page.)

Primary Examiner—Wellington Chin
Assistant Examiner—Conguan Tran
Attorney, Agent, or Firm—Dicran Halajian

[57] ABSTRACT

A digital transmission system comprising a receiver, the receiver including a receiver input stage and a digital memory for storing a sequence of binary symbols of sample values, formed in the receiver input stage, of a signal distorted by a transmission channel, and an equalizer for forming a sequence of binary estimates from the sample values by an impulse response of a substitute system describing the transmission channel, the impulse response being determined by first correlations of coefficients of a known training sequence with the sample values of a part of the known training sequence extended by at least one binary symbol. To make a channel estimation possible for a higher degree of the impulse response of the transmission channel, and also to carry out the channel estimation always with a maximum quality, a variable first correlation window size and a variable number of first correlations are used for adapting the impulse response of the substitute system to the impulse response of the transmission channel. A reduction of the correlation window size enables more cross-correlation values to be formed with one sequence of sample values, so that an increase of the degree of the impulse response of the estimated transmission channel becomes possible. With a more favorable transmission behavior, the correlation window size can be extended by one or more known binary symbols, so that the quality of the estimate of the impulse response is enhanced.

5 Claims, 2 Drawing Sheets

U.S. PATENT DOCUMENTS

| | | | |
|---|---|---|---|
| 5,452,351 | 9/1995 | Yamamoto | 379/221 |
| 5,475,710 | 12/1995 | Ishizu et al. | 375/232 |
| 5,479,444 | 12/1995 | Malkamaki et al. | 375/231 |
| 5,519,727 | 5/1996 | Okanoue et al. | 375/232 |
| 5,533,066 | 7/1996 | Yamaguchi et al. | 375/341 |
| 5,539,815 | 7/1996 | Samba | 379/220 |
| 5,648,991 | 7/1997 | Namekata et al. | 375/341 |

OTHER PUBLICATIONS

"Application of a Simplified Fano Metric to Adaptive Receivers for Digital Mobile Radio Systems", Gerd Zimmermann and Werner Rupprecht, Telecommunication Systems Letter, vol. 5, No. 3, May–Jun., 1994.

"Delayed Decision–Feedback Sequence Estimation", A. Duel–Hallen and C. Heegard, IEEE Transactions on Communications, vol. 37, No 5, pp.428–436, 1989.

"Optimum and the Sub–Optimum Detection of Coded Data Disturbed by Time–Varying Intersymbol Inerference", W. Koch and A. Baier, in Proceedings of the Globecom 1990, pp.807.5.1–807.5.6, San Diego, 1990.

"Optimal Decoding of Linear Codes for Minimizing Symbol Error Rate", L.R. Bahl, J. Cocke, F. Jelinek, and J. Raviv, IEEE Transactions on Information Theory, IT–20: pp. 284–287, 1974.

"TCM on Frequency–Selective Fading Channels: A Conparison of Soft–Output Probabilistic Equalizser", P. Hoher, in Proceedings of the Globecom 1990, pp. 401.4.1–401.4.6, San Diego, Dec. 1990.

"The Viterbi Algorithm", G.D. Forney, Jr., IEE Proceedings, vol. 61, pp. 268–278, 1973.

EQUALIZER WITH EXTENDED CHANNEL ESTIMATION FOR A RECEIVER IN A DIGITAL TRANSMISSION SYSTEM

BACKGROUND OF THE INVENTION

The invention relates to a digital transmission system comprising a receiver, the receiver including a receiver input stage and a digital memory for storing a sequence of binary symbols of sample values 1 formed in the receiver input stage 1 of a signal distorted by a transmission channel, and an equalizer for forming a sequence of binary estimates from the sample values by means of an impulse response of a substitute system describing the transmission channel, this impulse response being determined by first correlations of coefficients of a known training sequence with the sample values of a part of the known training sequence extended by at least one binary symbol.

Furthermore, the invention relates to a receiver including a receiver input stage 1 and including a digital memory for storing a sequence of binary symbols of sample values 1 formed in the receiver input stage 1 of a signal distorted by a transmission channel, and an equalier for forming a sequence of binary estimates from the sample values by means of an impulse response of a substitute system describing the transmission channel, this impulse response being determined by first correlations of coefficients of a known training sequence with the sample values of a part of the known training sequence extended by at least one binary symbol.

DESCRIPTION OF THE RELATED ART

Such receivers are used, for example, in digital mobile radio according to the GSM standard. According to the GSM standard, digital signals are transmitted in a TDMA method by a GMSK modulation. The data transmission is then influenced by a time-variant transmission channel. More particularly, multipath propagation and reflections determine differences of delay and phase shifts for the transmitted digital data symbols in the received signal and lead to a superpositioning of adjacent data symbols. The fact that a received signal for a data symbol is influenced by d previous data symbols is known as intersymbol interference (ISI). Then d is an integer defining the memory depth of the transmission channel.

For the equalization of the received signal which is linearly distorted as a result of multipath propagation and transmitting-end and receiving-end band limitation filters (intrinsic impulse noise with linear demodulation of the GMSK signal), the receiver is to be adapted, for data reconstruction, to the respective time-variant transmission properties of the transmission channel. Therefore, an estimation is made of the respective impulse response of the currently distorting transmission system, this system comprising not only the transmission channel, but also the influences of the GMSK modulation, and a receiver input stage which produces sample values of the received digital signal. For this purpose, a substitute system describing the transmission system is formed, with the aid of which, impulse response data are estimated according to the Maximum Likelihood Sequence Estimation (MLSE) method via the execution of a Viterbi algorithm, more particularly, a soft-output Viterbi algorithm, or a single symbol estimation method.

With this method, the most probable transmit sequence is determined from all possible data sequences, while taking into account the received sequence and the estimated impulse response of the transmission system. More particularly, the Viterbi algorithm is suitable for estimating the data symbols according to the MLSE method. The Viterbi algorithm is known from "The Viterbi algorithm", G. D. Porney Jr., IEEE Proceedings, Vol. 61, pages 268–278, 1973. A more accurate estimation of the data symbols is provided by the soft-output Viterbi algorithm, which is known, for example, from "A Viterbi algorithm with soft-decision outputs and its applications", J. Hagenauer and P. H öher, Proceedings of the GLOBECOM 1989, pages 47.1.1–47.1.7, Dallas 1989. Use is also made of maximum a posteriori symbol-by-symbol decoder algorithms according to "Optimal decoding of linear codes for minimizing symbol error rate", L. R. Bahl, J. Cocke, F. Jelinek, and J. Raviv, IEEE Transactions on Information Theory, IT-20: pages 284–287, 1974, or modification of this algorithm 1 respectively, found in "Optimum and Sub-Optimum Detection of Coded Data Disturbed by Time-Varying Intersymbol Interference", W. Koch and A. Baier, Proceedings of the GLOBECOM 1990, pages 807.5.1–807.5.6, San Diego, December 1990. With an equal value of the estimation of the received signals, the manufacturing costs of the equalizer in the first approximation proportionally rise by $2^d$ i.e, they rise exponentially with the depth d of the memory of the transmission channel. With the state-of-the-art methods, an equalization can only be effected for impulse noise covering five symbol intervals (binary) which corresponds to about 18 $\mu$sec. The intrinsic impulse noise restricts the maximum delay difference of the propagation paths in multipath propagation to about 13 $\mu$sec, which corresponds to about 4 km difference of path length. In practice, this is often inadequate. With a fixed degree of the substitute system for a constant state-of-the-art memory depth d of the transmission channel, the channel estimation requires a limitation to a superpositioning of six data symbols i.e. to a channel estimation of the fifth degree. As a result of the time variants of the channel transmission properties, however, it often occurs that the memory depth d of the transmission channel is smaller than 5. A channel estimation of the fifth degree will then lead to a larger variance of the estimation error than necessary i.e. the possibility of improving the quality of the channel estimation with favorable transmission properties (more particularly, in a static channel) is not utilized.

From U.S. Pat. No. 5,199,047 a receiver is known for a digital transmission system, which receiver includes an equalizer. This receiver may be used, for example, in digital mobile radio according to the GSM standard. A channel characteristic featuring the transmission route is to be predefined for the equalizer. A channel survey is then provided per time slot on the basis of the time-variant transmission properties of the channel. This survey is made with a known training data sequence which is stored in the receiver. A channel estimator produces a channel impulse response by processing the training data sequence received in distorted fashion together with the training data sequence stored in undistorted form. In the embodiment it is indicated that for reasons of computation time 1 it may be useful, under certain circumstances, to take fewer elements into account for the comparison as long as a sufficient quality value is obtained. The elements then correspond to the elements of the estimate of the training sequence which are compared to the respective sample values. The reduction of the computation time is obtained in that fewer elements are used for the comparison, whereas the number of correlations 1 which determine the degree of the channel impulse response formed 1 remains the same. That is, the quality of the channel estimation, and thus also of the whole reception, deteriorates.

SUMMARY OF THE INVENTION

It is therefore an object of the invention to provide a channel estimation, which makes a channel estimation possible for a higher degree d of the impulse response of the transmission channel, so that an equalization of the received signal becomes possible also in a series of rather large delay differences in the multipath propagation of the signal. On the other hand, the channel estimation is always to be effected with maximum quality i.e., with minimum variance of the estimation error.

The object according to the invention is achieved in that a variable first correlation window size and a variable number of first correlations are used for adapting the impulse response of the substitute system to the impulse response of the transmission channel. A reduction of the correlation window size enables more cross-correlation values to be formed with one sequence of sample values, so that an increase of the degree of the impulse response of the estimated transmission channel becomes possible. Compared with the state of the art, and by reducing the correlation window size by one binary symbol, a degree increased by unity can be estimated instead of the estimation of the degree d=5 of the transmission channel. With the invention, a delay difference 1 which can be equalized up to 29.4 μsec can, be achieved without considerably enhancing the complexity of the equalization algorithm. The reduction of the correlation window size causes the quality of the estimated impulse response to diminish and the variance of the estimation error to increase. If, for example, a more favorable transmission behavior may be assumed i.e., the degree of the estimated impulse response is smaller than in the state of the art (d=5), the correlation window size may be increased by one or several known binary symbols. As a result, larger window sizes than with the state of the art are possible, so that the quality of the estimation of the impulse response is enhanced and the variance of the estimation error is minimized. By increasing the correlation window size, fewer cross-correlation values can be formed, so that the possible degree of the transmission channel impulse response to be estimated diminishes.

In a preferred embodiment, the coefficients of the known training sequence 1 reduced or extended by at least one binary symbol 1 are used for forming the first correlations with the sample values of a part of the extended training sequence. For varying the correlation window size, the known training sequence is reduced or extended. Since the part of the sequence of sample values with which correlations are made also corresponds to the correlation window size, the more different correlations can be formed, the larger the difference between the reduced or extended training sequence and the total sequence of sample values will be.

In an advantageous embodiment of the invention, the first correlations are used to be combined to a vector 1 and the vector comprises a matrix for multiplying purposes, the elements of the matrix being formed by second correlations of coefficients of the known training sequence reduced or extended by at least one binary symbol with a respective part of the training sequence extended by at least one binary symbol more. An extension or reduction of the correlation window size requires an error in the calculated coefficients of the first cross-correlation functions. This may lead to a less accurate estimation of the coefficients of the estimated impulse response of the transmission channel than in the state of the art. As a result of the multiplication of the correlation coefficients with a suitable matrix, the same variance of the estimation error as in the state of the art can also be achieved for a different degree than 5 of the estimated impulse response of the transmission channel. The elements of the matrix are then formed by cross-correlations between the training sequence extended by at least one binary symbol and the training sequence part determined by the window sizes of the first correlations. Since the training sequences used are particularly known for mobile radio according to the GSM standard, also the cross-correlations of parts of the extended training sequence and thus the elements of the matrix are known.

In a preferred embodiment, a memory is used for storing the respective matrix for each training sequence and each reduction and extension of the respective training sequence. Since the training sequences, and thus the elements formed by correlations with different window sizes, are known, they need not be calculated anew each time, but can be determined separately and stored. Since both the magnitude of the squared matrix and the individual elements of the matrix depend on the respective degree of the transmission channel impulse response to be estimated, and, obviously, on the respective training sequence used, the matrix is to be calculated and stored for each degree of the impulse response to be estimated and all possible training sequences.

In an advantageous further embodiment of the invention, there is provided that for adapting the impulse response of the substitute system to the impulse response of the transmission channel, at least one repetition of the formation of the first correlations is effected, so that the respective beginning of the training sequence in the sample values, this beginning being determined by means of the preceding correlations, and the most favorable correlation window size are used for the repetition. A repetition of the channel estimation by the formation of the first correlations provides that the estimation can be adapted to the current transmission behavior. First, for example, a channel estimation is made for a high assumed degree of the impulse response of the transmission channel (for example, d=7), to select the actual degree and the position of the zero instant. A window for successive coefficients to be evaluated may then be defined, so that contributions of estimated coefficients outside this window do not considerably exceed the calculated spreading of the estimation error. For establishing the position of the beginning of the training sequence in the sequence of sample values, the position of this instant in the preceding transmission time slot is started from. Based thereon, first a higher degree of the impulse response of the transmission channel is expected and the exact instant is determined for an improved synchronization of the signal. On the basis of this first channel estimation there may also be established how good the first estimation of the degree of the impulse response of the transmission channel was. For a second channel estimation, the expected degree d determined at the first attempt and the optimum position of the zero instant are used. In this manner, the variance of the estimation error is minimized. With the values found at the first attempt, the degree of the transmission channel impulse response to be estimated can be increased, to cancel or equalize larger delay differences in the received signal.

These and other aspects of the invention will be apparent from and elucidated with reference to the embodiments described hereinafter.

DESCRIPTION OF THE PREFERRED EMBODIMENTS

Figure 1:
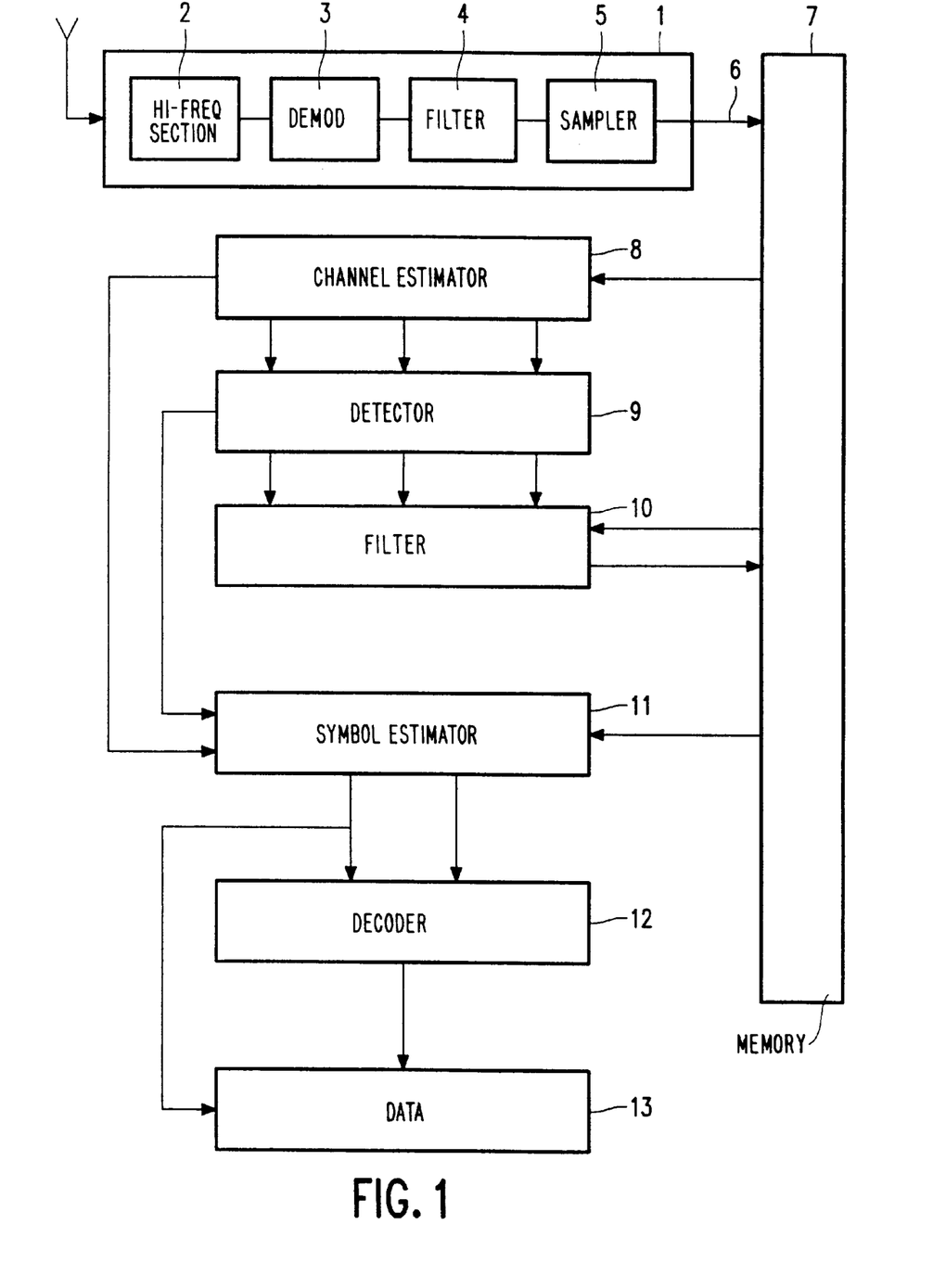
FIG. 1 shows a block circuit diagram of the receiver according to the invention of a digital transmission system.

FIG. 1 shows a receiver for a digital transmission system. In its receiver input stage 1 the receiver comprises a high-frequency section 2, an I/Q demodulator 3, a band-limiting filter 4 and a sampler 5. The sample values $r_k$ 6 are stored in a digital memory 7. The data from this digital memory 7 are rendered available to the channel estimator 8. In the channel estimator 8, an impulse response of the transmission system is estimated via a known training sequence in the received signal. Based on this impulse response, an all-pass detection 9 takes place for converting the impulse response in the all-pass filter 10 into a minimum or maximum-phase system without a loss of accuracy of the estimation. For this purpose, the all-pass filter 10 first takes the sequence of the sample values 6 from the digital memory 7 and stores the filtered values again in the digital memory 7. With the aid of the coefficients of the impulse response of the transmission system, these coefficients being determined in the channel estimator 8, the symbol estimator 11 makes a symbol estimation with state reduction according to the Maximum Likelihood Sequence Estimation (MLSE) method via a Viterbi algorithm. Reliability information for the symbol estimation is then additionally formed, this information is optionally processed together with the estimated data in a decoder 12. When not only the data symbols themselves, but also the probability of their correct detection is available, a soft-decision decoding can be used in the decoder 12. The transmitted payload data 13 are formed therefrom.

On the transmission link situated between a transmitter and the receiver input stage 1, a transmitted signal is distorted by multipath propagation due to reflections and superpositioning of noise and further disturbing signals. As a result, a binary digit $b_k$ of a binary signal b transmitted at a discrete instant k is superimposed by delayed signal portions of binary digits $b_{k-1}$, $b_{k-2}$, . . . transmitted earlier. This superpositioning corresponds to a signal distortion. Consequently, the signal received for a transmitted binary digit can no longer be assigned unambiguously to a low or a high level. In that case, the transmission channel has a memory size d, where d denotes the number of interfering adjacent symbols. The memory size d can also be defined as a quotient of the length of the channel impulse response of the transmission channel and a bit duration of the received signal minus 1, where the larger integer of this result denotes d. The signal received from the receiver input stage 1 has an analog signal waveform as a result of these superpositionings, this waveform cannot be assigned without equalization to the originally transmitted binary value. For this purpose, the signal received in the receiver input stage 1 is sampled by the sampler 5 at equidistant instants k.

The influence of already transmitted binary digits depends on the delay of the signal portions arriving delayed at a receiver input stage 1. After a certain time interval, which depends on the transmission channel characteristic, the influence is no longer essential and, therefore, needs no longer be taken into account for the equalization. As a rule, the delay is expressed as a number of binary digits transmitted within this time interval. With this, each sample value $r_k$ 6, which can be assigned to a binary digit $b_k$ transmitted at an instant k, depends on the binary digit $b_k$ which can be assigned to this sample value, and d binary digits $b_{i-2}$, $b_{i-2}$, . . . , $b_{i-d}$ immediately preceding this binary digit $b_k$.

Figure 2:
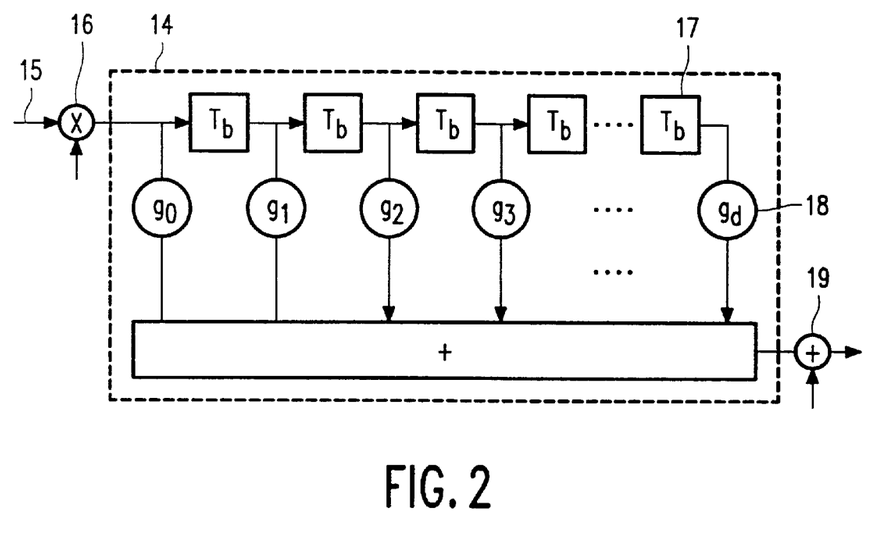
FIG. 2 shows a block circuit diagram of a substitute system describing the transmission channel, this system producing an impulse response for channel estimation.

A channel model, which approximately describes the dispersive transmission channel by a linear finite transversal filter, forms a basis for the equalization of a sequence of sample values 6 by means of the digital memory 7 which renders the sample values 6 available to the channel estimator 8 for the time interval of a transmit time slot. FIG. 2 shows a block circuit diagram of a substitute system 14 which corresponds to this transversal filter. The multiplication 16 of a binary signal 15 by $j^k$ corresponds to the $\pi/2$ shift 2PSK modulation used in mobile radio according to the GSM standard. An incoming sequence of binary symbols is read into the d memory cells of the substitute system 14 via delay elements 17. By means of the filter coefficients, of the substitute system 14 the individual binary symbols are factored and the values obtained are subsequently summed together. An addition 19 of white, discrete-time, complex noise forms output values of the substitute system 14 which are copied from the sample values 6 actually recovered from the dispersive transmission channel in the receiver input stage 1. The times of the delay elements 17 then correspond to the equidistant distances of successively sent binary symbols. In this manner, attempts are made, at the receiving end, to copy the transmission properties of the transmission channel via suitable filter coefficients. For example, the distortions occurring on the transmission path are copied by the substitute system 14 by the linear combinations which have memories. The transmission channel is copied by respectively setting the filter coefficients 18. The filter coefficients 18 can then be derived from the sample values 6 of an estimated impulse response of the transmission channel. For this purpose, for example, a so-termed training sequence can be used, this beginning sequence comprising a binary symbol sequence known both to a transmitter and a receiver. Each time the training sequence is received, the filter coefficients 18 are set so that, once the substitute system has been traversed, a copy is made of the transmission channel that has the fewest errors.

Figure 3:
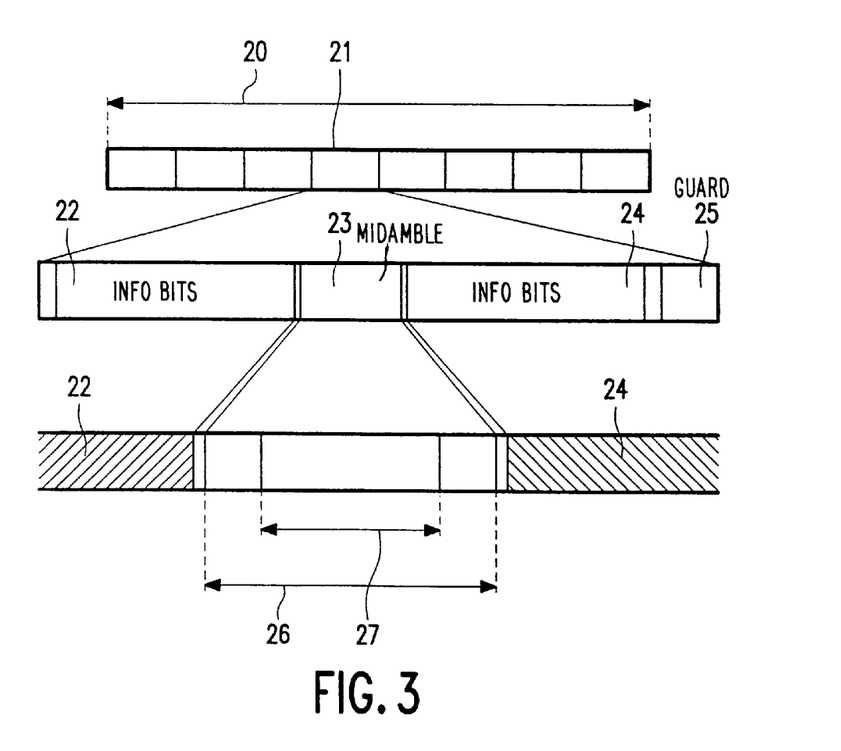
FIG. 3 shows the structure of a TDMA frame in GSM mobile radio with the structure of a single time slot which time slot contains a training sequence necessary for the channel estimation.

FIG. 3 shows a structure of a TDMA frame 20 used in mobile radio according to the GSM standard. In a frame 20 having a length of 4.615 ms these are accommodated 8 information channels which have each a time slot 21, so that the channels are assigned each 0.577 ms in which 159 bits are sent. The middle part of the bit sequence of a time slot forms a so-called midamble 23 having 26 bits which are framed by a so-called housekeeping bit. To the exterior, the two sides have each 57 information bits 22 and 24 followed each by 3 so-called tail bits. At the end of the time slot, there is a guard interval 25. The midamble 23 contains in the middle a so-called training sequence 27 having 16 bits, this sequence being known both in the transmitter and in the receiver. The training sequence 27 in mobile radio according to the GSM standard is extended on either side by five bits. For a periodic extension of the training sequence on either side, the extension is known and this is called an extended training sequence 26.

The equalization method in the receiver according to this invention, which method can be realized with hardware components and via a software solution, comprises the following components:
1. Extended channel estimation
2. All-pass detection
3. All-pass filtering 4. Sequence estimation with a reduced number of states including a determination of the reliability of individual symbols.

FIG. 1 shows the block circuit diagram of the proposed receiver for mobile radio according to the GSM standard. This equalization method may be applied both to the base station and to the mobile stations.

In the receiver input stage 1, a sequence $<r_k>$, $k \in Z$, of complex sample values 6 in the baseband is recovered from the high-frequency input signal in similar fashion to that of the state of the art. Then, k denotes the discrete time in the clock of the binary transmit symbols 15. The GMSK modulation method of GSM is approximated, as usual, at the receiving end as $\pi/2$ shift 2PSK modulation and accordingly demodulated in linear fashion. Between the transmitting-end sequence $<b_k>$ of binary symbols 15, which are represented in bipolar fashion by the amplitude coefficients $b_k \in \{-1; +1\}$, and the sequence $<r_k>$ of the receiving-end sample values 6, the effects of GMSK modulation, linearly distorting transmission channel, additive noise, I/Q demodulation, band limitation and sampling can very well be modeled by a discrete-time substitute system 14 having degree d and complex-value coefficients 18, and an addition of discrete-time white complex-value noise 19 according to FIG. 2. In FIG. 2, $T_b$ in the delay elements 17 denotes the distance in time between two binary symbols ($T_b$=1/(270.833 kHz)). The multiplication 16 of the binary symbol sequence by $j^k$ (j:=√(-1), (imaginary unit) describes the $\pi/2$ shift 2PSK modulation. The substitute system 14 contains d binary memory cells which contain the amplitude coefficients ±1 and ±j alternating with time. In this manner, $2^d$ different memory states of the delay line of the substitute system 14 are possible in each step.

The sequence $<r_k>$ of complex sample values 6 is stored and off-line processed in real time. The sequence is added to the extended channel estimation as shown in FIG. 1. Based on the extended training sequence 26 of 26 binary symbols in the middle of a so-called GSM burst (midamble 26), the time position of the sample values, the degree d of the currently available distorting substitute system 14 as shown in FIG. 2, and its complex-value coefficients 18 are determined. The z-transform of the estimated sequence $<\hat{g}_i>$; $i \in \{0,1, \ldots, d\}$ of filter coefficients $\hat{g}_i$ is denoted $$\hat{G}(z) = \sum_{i=0}^{d} \hat{g}_i \cdot z^{-1}$$

In the unit "all-pass detection" 9, the impulse responses or transfer functions $A(z)$ and $\overline{A}(z)$ of two all-pass systems are detected, so that in the resulting system $\hat{G}(z) \cdot A(z)$ has a minimum phase and $\hat{G}(z) \cdot \overline{A}(z)$ has a maximum phase.

The degree of the resulting systems then ideally does not increase. Only, if instead of the required all-pass transfer functions, approximations thereof are used, can a (slight) increase of degree occur.

The signal $<r_k>$ 6 is filtered in a positive direction by the system $A(z)$ negative direction by the system $\overline{A}(z)$, beginning from the middle of the burst, thus starting from the training sequence 27. If a decision-based adjustment of the channel estimation is omitted, only a filtering of the total signal $<r_k>$ 6 is needed for one burst.

The symbol sequence is determined by means of a sequence estimation method with state reduction, preferably beginning in the middle of the burst in the positive direction on the basis of the signal distorted by a minimum-phase substitute system, and in the negative direction on the basis of a signal distorted by a maximum-phase substitute system. Optionally, the sequence estimation method with state reduction and detection of symbol reliability 11 in accordance with this invention can be used for this (purpose(see item 4). A decision-supported adjustment of the channel estimation 8 may then be effected in like manner to that of the state of the art.

If this is dispensed with, a continuous estimation of the symbol sequence with state reduction 11 of the whole burst in a direction (preferably in a positive direction) beginning from the start (or end, respectively, in the case of negative direction) of the sequence $<r_k>$ filtered only with the all-pass transfer function $A(z)$ (with $\overline{A}(z)$ in the case of a negative direction) is possible. The known data symbols of the extended training sequence 26 may then be used similarly to a sequence estimate in two directions for the respective half burst to enhance the reliability (use of a priori probabilities 0 or 1, respectively).

Re 1. Extended Channel Estimation:

Whereas in the state-of-the-art method a channel estimation 8 is only possible for substitute systems 14 $\hat{G}(z)$ shown in FIG. 2, having degree d=5, there is proposed to adapt the channel estimation method to the respective system to be estimated. This not only achieves that even for higher degrees, thus for larger delay differences in the multipath propagation of the signal, only one channel estimation becomes possible, but at any rate a channel estimation with a maximum value follows, that is, with a minimum variance of the estimation error.

The extended channel estimation is based on a channel estimation for the variable expected degree c of the substitute system 14. The c+1 coefficients of the system with expected degree c are determined by the $[\hat{g}(c)]=(\hat{g}_0(c), \hat{g}_1(c), \ldots, \hat{g}_c(c))$ transformation $$[\hat{g}(c)] = [y(c)] \cdot \phi^{-1}(c)$$

The c+1 components $y_k(c)$ of the vector $[y(c)]$ are then (as usual) formed by correlation of the sequence $<r_k>$ of complex sample values 6 from the received signal having the coefficients of a part of the (periodically extended) training sequence 26 $<a_k>$:

$$y_k(c) = \sum_{i=k_u(c,k)}^{k_o(c,k)} r_{i+k} \cdot a_i^* ; k \in \{0, 1, \ldots, c\}$$

For simplicity of the representation, the discrete instant k=0 is used for the expected beginning of the training sequence 27 in the received sequence $<r_k>$. The two summation limits $k_u(c,k)$ and $k_o(c,k)$ are generally functions of the degree c and of the time index k. A possible selection of these summation limits is:

$$k_o(c,k)=25-c$$

$$k_u(c,k)=c,$$

which is advantageous in that the summation for all instants k is effected over as many elements. It may also be wise to choose the different summation limits for different discrete instants k in the clock of the binary symbols. For example, at the beginning of the extended training sequence 26, a long sequence of sample values could be correlated with, and for following instants k, the lower summation limit $k_u$ could be incremented. For the extended training sequence 26, similarly to the data sequence, is to be taken into account the interpretation of GMSK as π/2 shift 2PSK modulation, thus a multiplication 16 of the binary, bipolar extended training sequence 26 by $j^k$.

The matrices $\Phi^{-1}(c)$ are the inverse values of $(c+1)\times(c+1)$ matrices having the elements $$\varphi_{kl}(c) = \sum_{i=k_u(c,k)}^{k_o(c,k)} a_{i+l-k} \quad \phi(c) = \begin{pmatrix} \varphi_{00}(c) & \varphi_{01}(c) & \varphi_{02}(c) & \cdots & \varphi_{0c}(c) \\ \varphi_{10}(c) & \varphi_{11}(c) & \varphi_{12}(c) & \cdots & \varphi_{1c}(c) \\ \vdots & & & & \\ \varphi_{c0}(c) & \varphi_{c1}(c) & \varphi_{c2}(c) & \cdots & \varphi_{cc}(c) \end{pmatrix}$$

which represent the cross-crrelated values between the extended training sequence 26 $<a_k>$ and a shortened version. The matrices $\Phi^{-1}(c)$ are then easy to calculate. They are preferably for $0 \leq c \leq 7$ for all 8 training sequences used in GSM mobile radio stored in a ROM in the proposed receiver. In this manner, their real-time calculation is omitted.

By multiplying the vector [y(c)] by the matrix $\Phi^{-1}(c)$, the influence of non-fading values of the cross-correlated $\phi_k(c)$ with $k\neq 0$ and $c\neq 5$ is raised to the channel estimation. The training sequences in GSM mobile radio are selected, as is known, so that especially for c=5 the following holds:

$$\phi^{-1}(5) = \phi(5) = E_6,$$

where $E_6$ denotes the 6×6 unit matrix.

Only in this special case for c=5, which is exclusively used for the state-of-the-art channel estimation, may the matrix multiplication be omitted. The limitation to c=5 used thus far is certainly the cause of the following disadvantages:

Only the coefficients of the substitute system 14 up to a maximum of degree c=d=5 can be estimated. Thus the channel estimation 8 fails when higher delay differences occur with a multipath propagation of the signal, or a shift of the estimated instant k=0 as against the actual beginning of the training sequence 27.

When in reality a smaller degree than 5 of the substitute system 14 shows up, the variance of the estimation error is unnecessarily large.

By multiplying the vector [y(c)] by stored matrices $\Phi^{-1}(c)$ according to the invention, a channel estimation for expected degrees $0 \leq c \leq 13$ becomes possible. For c>7, certainly the variance of the estimation error clearly increases, so that a limitation to $0 \leq c \leq 7$ is to be recommended in practice.

The extended channel estimation 8 is preferably as follows:

First a channel estimation for a high expected degree (for example, c=7) is calculated, to determine the actual degree and the position of the zero instant. Advantageously, a window can be determined for coefficients to be evaluated in the following, so that the values of estimated coefficients outside this window do not considerably exceed the computational tolerance of the estimation error (coefficient clipping).

For a second channel estimation, the expected degree c determined at the first attempt and the optimum position of the zero instant are used. In this manner, the variance of the estimation error is minimized.

Due to the twofold computation of estimated filter coefficients 18, a channel estimation 8 is achieved which is adapted to the zero instant and degree of filtering. The additional cost necessary for this purpose only stands for a second matrix multiplication.

Re 2. All-pass Detection:

For the estimated discrete-time substitute system $\hat{G}(z)$ 14, two (or one, respectively) all-pass filters A(z) and $\tilde{A}(z)$ are calculated via which minimum and maximum-phase overall systems arise. For all-pass detection 9, all current and recently proposed methods for factoring of $$G(z) \cdot G^*(z^{*-1})$$

can be used in a minimum-phase and maximum-phase part such as shown, for example, in "An Alternative Approach to Minimum Mean-Squared Error DFE with Finite Length Constraints", W. Gerstacker, International Journal of Electronics and Communications (AEÜ), Vol. 50 (No. 1), 1996, or "Zeitdiskrete Signalverarbeitung", A. V. Oppenheim and R. W. Schafer, Oldenbourg Verlag, Munich, Vienna, 1992.

Methods starting from the logarithm of the frequency response, the so-called Cepstrum, prove to be highly advantageous.

Re 3. All-pass Filtering:

The all-pass filtering 10 achieves that with respect to the sequence estimation with state reduction 11, a linear distortion of the data signal occurs caused by a minimum-phase or maximum-phase respectively, discrete-time substitute system 14 having degree c.

Only when the energy of the difference signal when two paths in a trellis diagram are split up is maximized, this trellis diagram can be drawn similarly to FIG. 2 for binary input symbols for the system 14 (see, for example, "Trelliscodierung in der digitalen Übertragungstechnik—Grundlagen und Anwendungen", J. Huber, Springer Verlag, Berlin, 1992), are signal-to-noise ratios caused by a state reduction in the sequence estimation negligibly small even for a drastic reduction.

If no decision-supported adjustment of the channel estimation 8 is made on the basis of the training sequence 27, an all-pass filtering 10 of the whole sequence $<r_k>$ by the system A(z) for generating a signal distorted by a minimum-phase substitute system 14 will suffice, because the sequence estimation in positive the direction can be effected over the whole burst. If, however, a decision-supported adjustment of the channel estimation 8 is made during the sequence estimation method, the part of the sequence $<r_k>$ of sample values 6 can be filtered out of the received signal converted into the baseband, starting with the training sequence 27 in positive direction by the system A(z), whereas the part in the negative direction can be filtered by the system $\tilde{A}(z)$. Starting from the training sequence 27, the sequence estimation 11 is in that case made separately in positive and in negative direction. In either case the all-pass filtering 10 achieves that the difference signal has maximum energy at the path split ups in the trellis diagram. The all-pass filtering 10 can be effected with any of the linear signal transformation methods customary in digital signal processing, for example, in the time domain by means of a discrete convolution with a FIR or IIR system, or by means of a discrete Fourier transformation, multiplication by the transfer function computed under item 2 in the frequency domain and, successively, inverted Fourier transformation.

Re 4. Sequence Estimation With Reduced Number of States:

All current methods of reducing the number of states for the sequence estimation of digital pulse amplitude-modulated signals, these signals being affected by impulse interference due to distortions, can be implemented, see, for example, "Delayed decision-feedback sequence estimation", A. Duel-Hallen and C. Heegard, IEEE Transactions on Communications, Vol. 37, No. 5, pp. 428–436, 1989. Preferably, the Decision-Feedback Sequence Estimation method discussed there is to be used in which a trellis diagram of the first $c_o$ binary delay elements of the substitute system 14 is formed with $2^{c_o}$ tates. For computing the metric in the Viterbi algorithm, the further coefficients 18 of this system are estimated by the symbols in the path registers at the respective states in the trellis diagram.

For the following channel decoding 12, it is helpful not only to estimate the channel symbols, but also their reliability, to be able to carry out so-called soft-decision decoding. In addition to determining the respective symbol, also the probability that this decision is correct can be determined. A sequence estimation method with state reduction and approximate calculation of the symbol reliabilities was shown, for example, in "TCM on Frequency-Selective Fading Channels: A Comparison of Soft-Output Probabilistic Equalizers" P. Höher, in Proceedings of the GLOBECOM 1990, pp. 401.4.1–401.4.6, San Diego, December 1990.

An optimum method of calculating the a posteriori probabilities of the input symbols of a trellis coder (in this specific case of a linearly distorting system 14), while taking its output symbols distorted by white noise 19 into account, is the algorithm for the maximum a posteriori single symbol estimation according to Bahl et al., see, for example "Optimal decoding of linear codes for minimizing symbol error rate", L. R. Bahl, J. Cocke, F. Jelinek, and J. Raviv, IEEE Transactions on Information Theory, IT-20: pp. 284–287, 1974. In this algorithm, the probabilities $\alpha_\gamma(i)$ for the states i=1, 2 . . . Z at step γ, while talking the trellis code output signals observed thus far γ−1 into account, are determined by means of a forward recursion, and probabilities $\beta_\gamma(i)$ for the trellis coder output symbols observed between the latest step L back to the step γ with an assumed state i in the current step γ are determined by means of a backward recursion, see, for example, "Trellis codierung in der digitalen Übertragungstechnik—Grundlagen und Anwendungen", J. Huber, Springer Verlag, Berlin 1992. In this manner, regarding the whole received sequence, the state probabilities $\Psi_\gamma(i)$ for the state i at step γ

$$\Psi_\gamma(i)=\alpha_\gamma(i)\cdot\beta_\gamma(i)$$

hold. With the trellis coder used, the symbol probabilities directly follow from the state probabilities.

According to "Optimum and the Sub-Optimum Detection of Coded Data Disturbed by Time-Varying Intersymbol Interference", W. Koch and A. Baier, in Proceedings of the GLOBECOM 1990, pp. 807.5.1–807.5.6, San Diego, 1990 and "TCM on Frequency-Selective Fading Channels: A Comparison of Soft-Output Probabilistic Equalizers" P. Höher, in Proceedings of the GLOBECOM 1990, pp. 401.4.1–401.4.6, San Diego, December 1990, the Bahl algorithm can be a reduced-state one similarly to the decision feedback Viterbi algorithm. With the forward recursion for calculating the $\alpha_\gamma(i)$, a path register is assigned to each of the current $2^{c_o}$ states, which path register is updated in each time window as with the DFSE algorithm, and is necessary for computing the branch metrics of the reduced trellis. The branch metrics are stored and used once again for the backward recursion to determine the $\beta_\gamma(i)$.

We claim:

1. A digital transmission system having a receiver, said receiver comprising:

a receiver input stage and a digital memory for storing a sequence of binary symbols of sample values formed in the receiver input stage of a signal distorted by a transmission channel, and an equalizer for forming a sequence of binary estimates from the sample values using an impulse response of a substitute system describing the transmission channel, said impulse response being determined by first correlations of coefficients of a known training sequence with the sample values of a part of the known training sequence extended by at least one binary symbol;

wherein a variable first correlation window size and a variable number of first correlations are used for adapting the impulse response of the substitute system to the impulse response of the transmission channel; and wherein the coefficients of the known training sequence reduced or extended by said at least one binary symbol are used for forming the first correlations with the sample values of the part of the extended training sequence.

2. A digital transmission system having a receiver, said receiver comprising:

a receiver input stage and a digital memory for storing a sequence of binary symbols of sample values formed in the receiver input stage of a signal distorted by a transmission channel, and an equalizer for forming a sequence of binary estimates from the sample values using an impulse response of a substitute system describing the transmission channel, said impulse response being determined by first correlations of coefficients of a known training sequence with the sample values of a part of the known training sequence extended by at least one binary symbol;

wherein a variable first correlation window size and a variable number of first correlations are used for adapting the impulse response of the substitute system to the impulse response of the transmission channel; and wherein the first correlations are combined with a vector, said vector comprising a multiplication matrix having elements which are formed by second correlations of coefficients of the known training sequence reduced or extended by said at least one binary symbol with a respective part of the training sequence extended by said at least one binary symbol.

3. A digital transmission system as claimed in claim 2, further comprising a memory for storing the respective matrix for each training sequence and each reduction and extension of the respective training sequence.

4. A digital transmission system having a receiver, said receiver comprising:

a receiver input stage and a digital memory for storing a sequence of binary symbols of sample values formed in the receiver input stage of a signal distorted by a transmission channel, and an equalizer for forming a sequence of binary estimates from the sample values using an impulse response of a substitute system describing the transmission channel, said impulse response being determined by first correlations of coefficients of a known training sequence with the sample values of a part of the known training sequence extended by at least one binary symbol;

wherein a variable first correlation window size and a variable number of first correlations are used for adapting the impulse response of the substitute system to the impulse response of the transmission channel; and wherein, for adapting the impulse response of the substitute system to the impulse response of the transmission channel, at least one repetition of the formation of the first correlations is performed, so that the respective beginning of the training sequence in the sample values is determined by means of the preceding correlations, and the most favorable correlation window size are used for the repetition.

5. A receiver comprising:

a receiver input stage and a digital memory for storing a sequence of binary symbols of sample values formed in the receiver input stage of a signal distorted by a transmission channel, and an equalizer for forming a sequence of binary estimates from the sample values using an impulse response of a substitute system describing the transmission channel, said impulse response being determined by first correlations of coefficients of a known training sequence with the sample values of a part of the known training sequence extended by at least one binary symbol;

wherein a variable first correlation window size and a variable number of first correlations are used for adapting the impulse response of the substitute system to the impulse response of the transmission channel; and wherein the coefficients of the known training sequence reduced or extended by said at least one binary symbol are used for forming the first correlations with the sample values of the part of the extended training sequence.

* * * * *